UNITED STATES PATENT OFFICE.

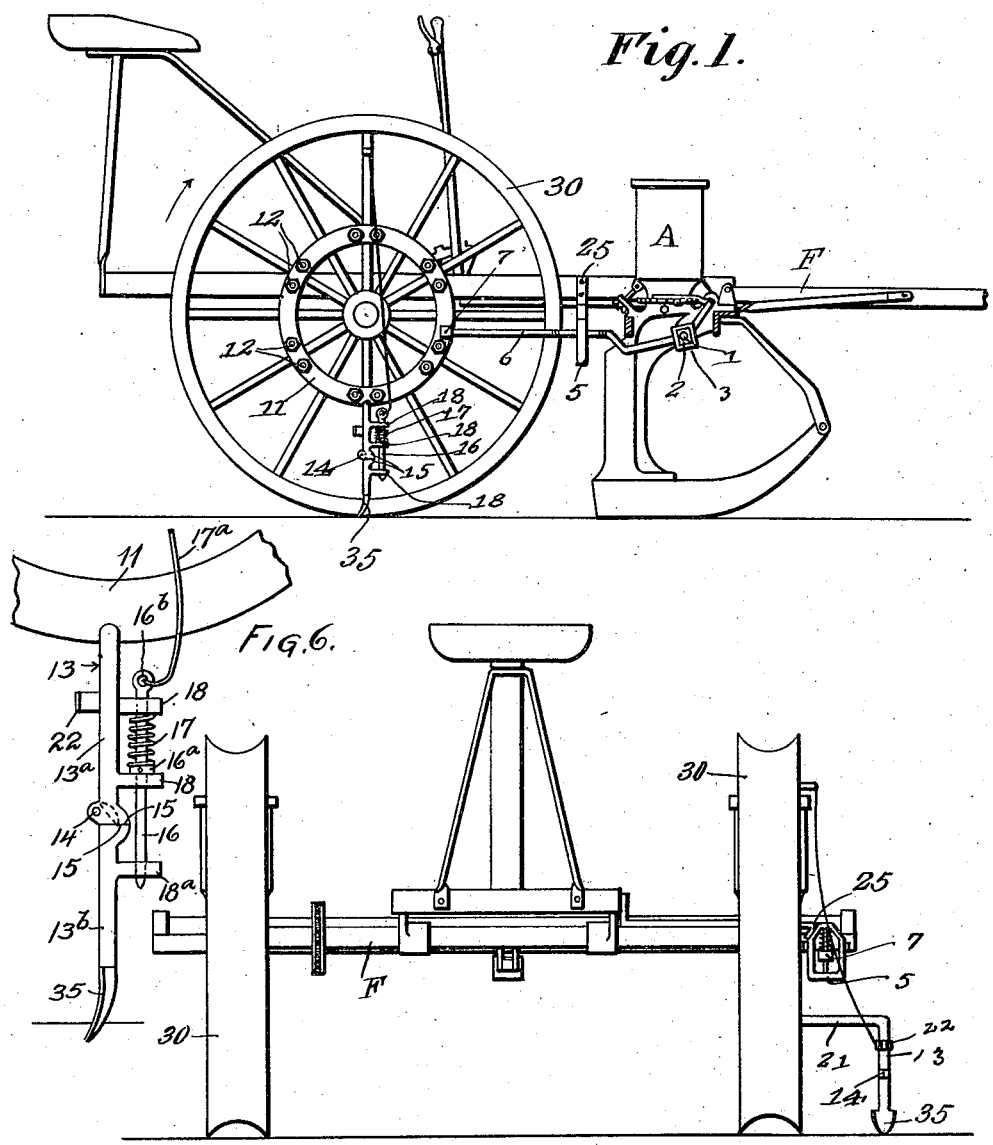

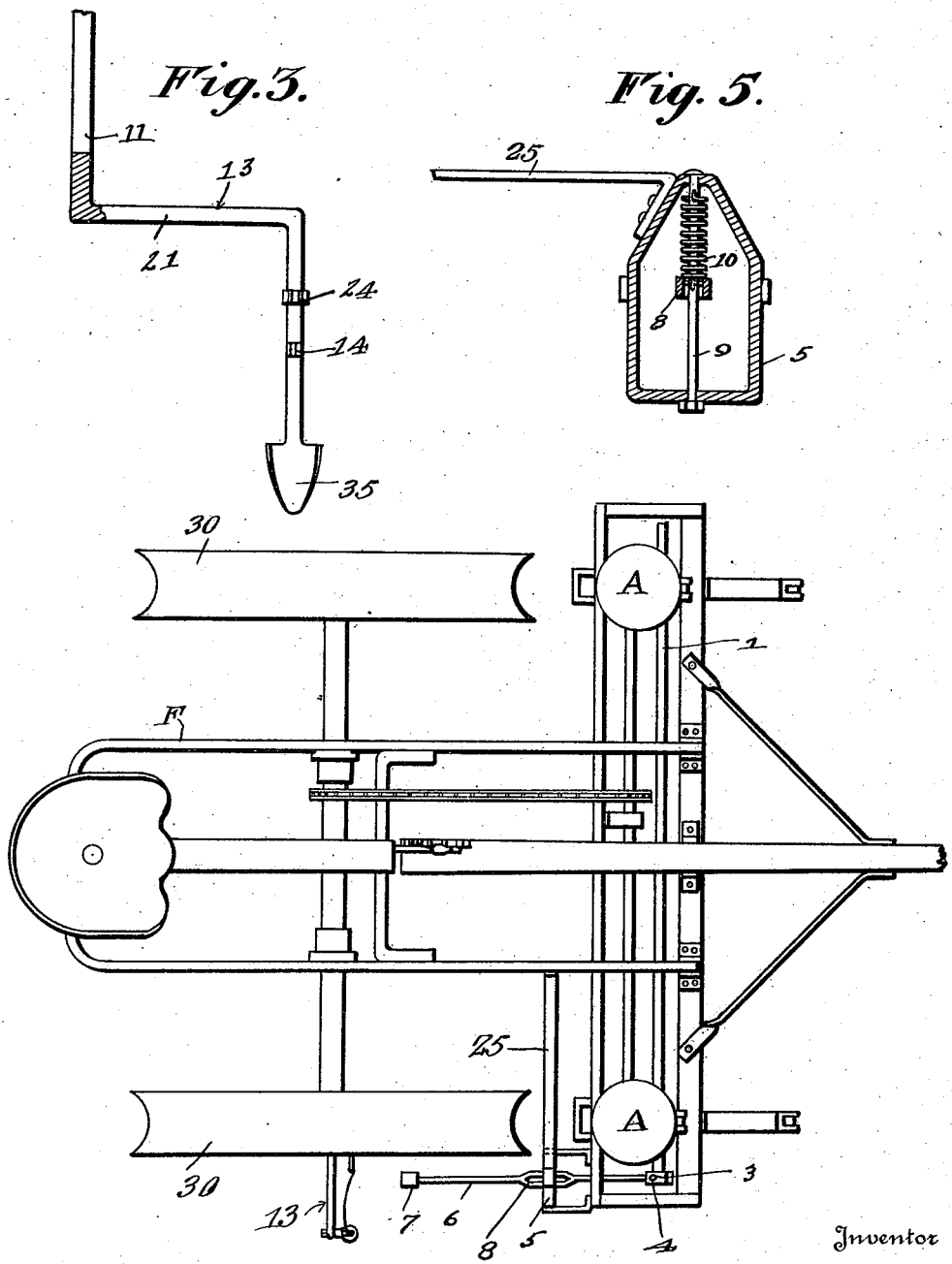

HERBERT JONES, OF BEVIER, MISSOURI.

MARKING DEVICE FOR PLANTERS.

1,420,550.  Specification of Letters Patent. Patented June 20, 1922.

Application filed December 27, 1919. Serial No. 347,664.

*To all whom it may concern:*

Be it known that I, HERBERT JONES, a citizen of the United States, residing at Bevier, in the county of Macon and State of Missouri, have invented new and useful Improvements in Marking Devices for Planters, of which the following is a specification.

This invention relates to a marking device for corn planters and the like.

An object of the invention is to provide a planter with a check row mechanism which may be simply attached.

A further object is to arrange the check row mechanism so that it may be operated only at the will of the operator.

Another object is to provide the check row mechanism with means whereby the distance between the checks can be adjusted to suit the conditions.

With the above and other objects in view I will now proceed to describe a specific embodiment of the invention as illustrated in the accompanying drawings wherein:

Figure 1 is a side elevation of a planter having the invention attached thereto.

Figure 2 is an end elevation of the planter.

Figure 3 is an enlarged detail view of the spade.

Figure 4 is a top plan view of the planter with the invention in place.

Figure 5 is a detail sectional view through a supporting yoke embodied in the invention.

Figure 6 is an enlarged detail view of the marking mechanism showing it in side elevation and in operative position.

In detail:

The corn planter to which this invention is applied may be of any suitable type and for the purpose of illustration I have selected that type in which a seed check rod or rock shaft 1 extends across the frame F and serves to control the flow of grain from the grain receptacles indicated by the letters A. As illustrated in Figure 1, one end of the rock shaft 1 is provided with a squared portion 2 which is received within a squared socket member 3 formed at one end of a rearwardly extending rod 6. The squared socket member 3 is held on the squared portion 2 of the rock shaft by means of a locking pin 4.

With reference to Figures 2 and 5, it will be noted that the rod 6 which extends rearwardly from the rock shaft 1 is passed through a yoke 5 rigidly secured to one side of the frame F by means of a bracket 25. The rod 6 is enlarged intermediate its ends and is slotted as indicated at 8 so as to receive a vertically arranged bolt 9 extended through the yoke. During the operation of the planter, the rod 6 partakes of an upward and downward swinging movement, and a contractile coil spring 10 attached to the rod and to the bolt serves to normally hold the rod in its upward or elevated position. When the rear enlarged end portion 7 of the rod 6 is moved downwardly by means to be later described, the coil spring 10 yields and serves to return the rod to its elevated position immediately upon being released.

The means employed for periodically swinging the arm 6 downwardly, comprises an L-shaped member 13 extending laterally from one of the main wheels 30 and secured thereto by an annulus 11 held upon the spokes of the wheel by U-bolts 12. The intermediate portion of the member 13 extends horizontally, as indicated at 21, and constitutes a cam for striking the enlarged portion 7 of the rod and moving the same downwardly whereby the seed dispensing mechanism will be operated.

As illustrated in Figures 1, 3 and 6, the vertical portion of the L-shaped member 13 is formed of a pair of hingedly connected sections 13ᵃ and 13ᵇ the latter of which is provided with a spade or marking element 35 adapted to engage the ground as the wheel is rotated. These sections 13ᵃ and 13ᵇ are connected by a rule joint including a pivot 14 and abutting shoulders 15. By this construction it will be seen that the outer section 13ᵇ is adapted to be swung inwardly in a clockwise direction so as to be in inoperative position. When thus swung inwardly, the outer section carrying the spade engages with a pair of co-acting retaining elements 22 provided on the inner section 13ᵃ. Swinging movement of the outer sections in the opposite direction is of course prevented by the engagement of the shoulders 15.

In order to hold the outer sections 13ᵇ in alignment with the inner section so that the device will be operative, I provide a pair of laterally extending apertured ears 18 on the inner section 13ᵃ aligning with a similar ear 18ᵃ on the outer section 13ᵇ. Slidable through the ears 18 is a rod 13 which carries a collar 16ª engaged by one end of a coil spring 17 which abuts against the innermost ear 18, the purpose of this spring being to force the rod 16 outwardly so that its outer end will engage within the aperture of the ear 18ª. The inner end of the rod 16 is formed with an eye 16ᵇ within which is connected one end of a cord 17ª or other flexible member which is secured to one of the spokes of the wheel and which may be grasped by the operator.

In the use of the device it will be seen that under ordinary conditions the section 13ᵇ of the marker is held in alignment with the section 13ª by the engagement of the rod 16 through the ear 18ª. As the wheel 30 rotates, it is apparent that at every rotation thereof the spade 35 will engage the ground and leave a row of holes therein which will serve as a guide for planting the next row, as will be readily apparent. When the use of the marker is not desired, it is merely necessary that the operator pull upon the flexible member 17 and retract the rod 16 out of engagement with the ear 18ª so that the outer section 13ᵇ may be swung inwardly and engage with the retaining members 22.

I claim:

1. In a corn planter including a wheel supported frame, marking mechanism comprising an annulus secured upon one of the wheels, a bracket carried by the annulus and including hingedly connected sections, and a spring-pressed plunger connected with said sections for holding the same normally in alignment, the spring-pressed plunger being withdrawable whereby to permit folding of the outermost section with respect to the other.

2. In a corn planter including a wheel supported frame, marking mechanism comprising a member secured upon one of the wheels and including inner and outer sections connected by a rule joint, the rule joint permitting folding of the outer section on the inner section in one direction and preventing such folding in the other direction, means for holding the outer section normally against movement in any direction comprising an apertured arm carried by the outer section, a pair of spaced apertured ears carried by the inner section and aligning with the first named ear, an outwardly spring-pressed plunger slidable through the second named ears and normally engaging through the first named ear, a flexible member connected with the inner end of the plunger whereby the same may be retracted to disengage the first named ear and spring retaining means on the inner section engageable by the outer section for holding the latter when in inwardly swung position.

In testimony whereof I affix my signature.

HERBERT JONES.